United States Patent Office 3,291,309
Patented Dec. 13, 1966

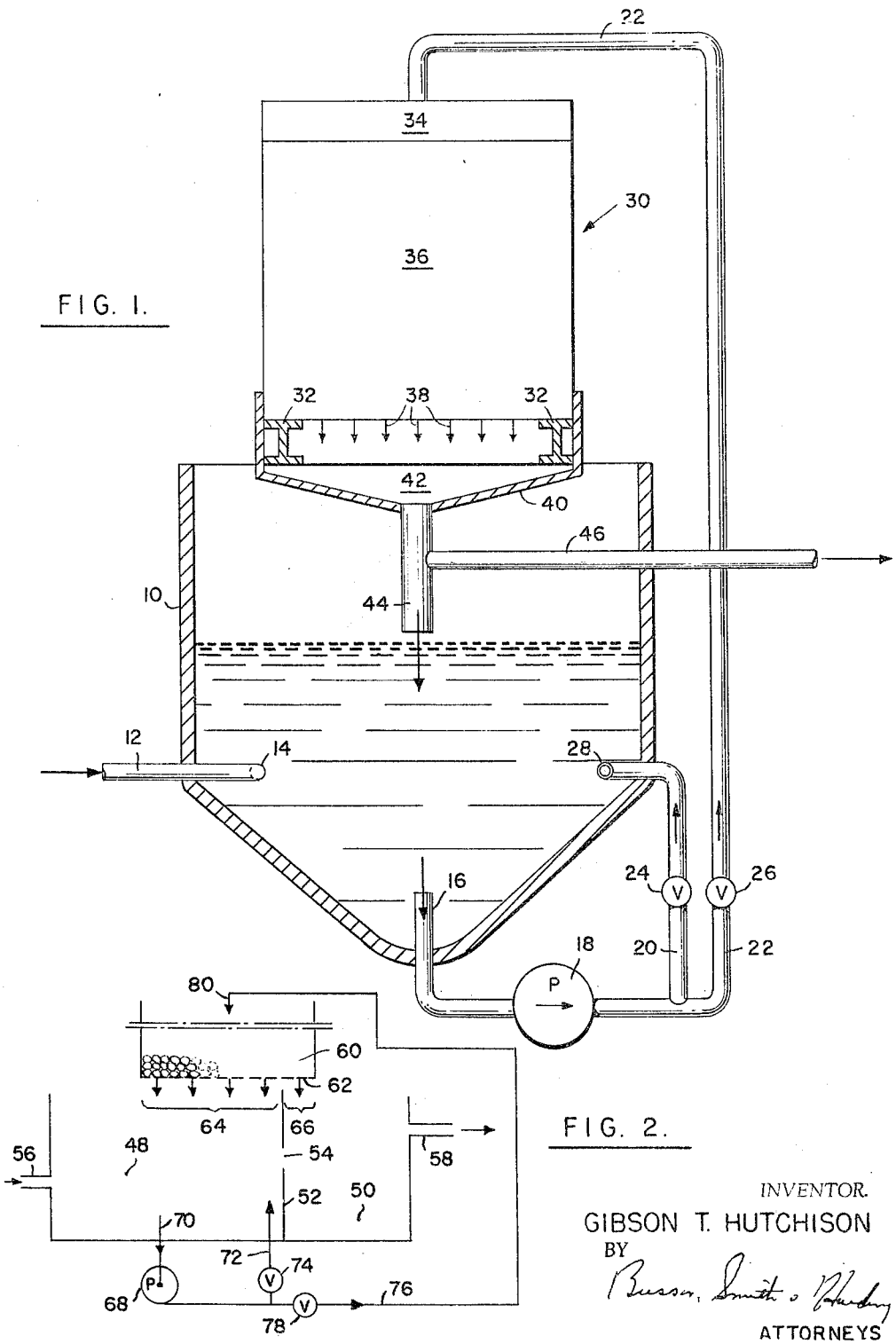

3,291,309
SYSTEM FOR THE TREATMENT OF SEWAGE OR THE LIKE
Gibson T. Hutchison, Maple Glen, Pa., assignor to Crane Co., Chicago, Ill., a corporation of Illinois
Filed Oct. 9, 1963, Ser. No. 314,980
2 Claims. (Cl. 210—151)

This invention relates to the treatment of sewage, this term being used herein to include wastes, industrial or otherwise, adapted to purification by biochemical treatment, and is particularly designed for use in those installations wherein the volume and/or biochemical oxygen demand content of the sewage varies over a wide range throughout an extended period of time. For example, the present invention is particularly designed to purify sewage such as may be produced during the operation of laundries, motels, schools or the like wherein large volumes of sewage are produced during certain portions of each twenty-four hour period, whereas only small volumes of sewage are produced during the remainder of the twenty-four hour period.

In order to even out the loading of the purification system in the above indicated types of installations, previous systems have been proposed which include a so-called trickling filter (essentially a biological oxidizer tower) and a recirculating tank ahead of the final purification unit so that a portion of the sewage in the tank is continuously withdrawn, circulated through the filter and returned to the tank wherein it is mixed with the incoming sewage. Thus, the load surges are averaged out in the tank and the biochemical oxygen demand on the final purification unit is reduced since the tank effluent is a mixture of raw sewage and the filter effluent. In addition the continuous recirculation through the trickling filter, in which biological reduction of the organic content of the waste occurs, makes it possible to obtain maximum efficiency from the unit because of the constant load which is optimum for biological reduction while still retaining the inherent advantage, i.e., resistance to shock load, ability to continue to remove BOD when heavily overloaded, etc., of a trickling filter.

The general object of the present invention is to provide a more efficient system by taking the output directly from the filter consistently with controlling the level in the recirculation tank, the taking of the output from the filter resulting in substantial reduction of the BOD content in the system effluent.

This object as well as others relating more particularly to details of construction and operation will become more fully apparent from the following description when read with reference to the accompanying drawing in which:

FIGURE 1 illustrates in diagrammatic section one embodiment of the present invention; and FIGURE 2 shows diagrammatically a second embodiment thereof.

Referring to FIGURE 1, numeral 10 indicates the recirculation tank into which the sewage is introduced through conduit 12. Conduit 12 may be connected directly to the source of raw sewage or, alternatively, this conduit may be the outlet of a primary purification unit such as a settling tank interposed between the recirculation tank and the source of the raw sewage. The internal end 14 of inlet conduit 12 is preferably directed so as to inject the sewage tangentially into the tank if the tank is circular, or along one wall if it is rectangular, and thereby assist in circulating the liquid within the tank so that no settling of settleable matter occurs therein.

A portion of the liquid in tank 10 is continuously withdrawn therefrom through conduit 16 connected to a recirculating pump 18 the output of which is connected to a pair of conduits 20 and 22 having respective control valves 24 and 26 for proportioning the amount of flow therethrough.

Conduit 20 is connected back to the recirculation tank wherein the internal end 28 is also directed tangentially or along a wall of the tank so that continuous circulation of the liquid in the tank is insured.

Conduit 22 extends upwardly and discharges into the top of the trickling filter 30 which, in the illustrated embodiment, is mounted above tank 10 by means of I-beams 32 extending across the top of the tank. Of course, it will be readily apparent that the trickling filter may be positioned at the side of the tank or even at a remote location if so desired.

Trickling filter 30 is of well known construction and includes top portion 34 forming a distribution box which spreads the effluent from conduit 22 across the cross-sectional area of the filter portion 36. This portion may contain as the filtering packing or medium stone, corrugated or granular polyvinyl chloride, polystyrene or polyvinylidene chloride, paper, asbestos, or the like, the packing being of a type exposing the sewage to oxygen to promote biochemical action as usual. The effluent from conduit 22 flows downwardly through the filter medium and trickles through a porous packing-retaining member forming the bottom of the filter, this flow being indicated by arrows 38.

All of the components described thus far are known and constitute the previous type of recirculating system described hereinabove wherein the total of the effluent from the trickling filter flows directly into tank 10 at all times and wherein the outlet from the system is through an overflow passage in tank 10.

The present invention departs from this type of prior system by providing selectivity of outflow. In accordance with FIGURE 1 there is provided a funnel-shaped member 40 which forms a collecting chamber 42 directly beneath the filter. Collecting chamber 42 is provided with a single conduit 44 which extends downwardly into tank 10 and terminates at a position which is below the maximum level to which the liquid in the tank may permissibly rise during maximum inflow through conduit 12. A laterally extending outlet conduit 46 is connected to conduit 44 at a vertical position which determines, by providing a free flow passage, substantially, the maximum and minimum levels between which the liquid in the tank may vary as a result of variations in inflow through conduit 12 from maximum to minimum.

The operation of the system is as follows. Raw sewage from the source or from a primary purification unit flows into tank 10 through inlet conduit 12. At the same time, liquid from tank 10 is continuously withdrawn through conduit 16 and pump 18 from which a portion thereof is returned to the tank through conduit 20 which discharges along the tank wall so as to circulate the liquid in the tank and prevent settling of settleable materials in the sewage. The remaining portion of the pump discharge flows through conduit 22 into trickling filter 30 which provides the favorable environment for reproduction and growth of the necessary micro-organisms required to oxidize organic matter by the aerobic process. As this process depends upon the presence of dissolved oxygen in the liquid the filter packing also assures maximum oxygen absorption. These processes occur as the liquid passes downwardly through the filter packing. The filter effluent is then collected by member 40 and flows through conduit 44 back to tank 10. So long as the level of the liquid in the tank is below the bottom of conduit 46, the recirculation through the filter continues with the effluent merely dropping through the conduit. With the entry of any material through inlet 12 the level in the tank 10 will rise, and visualizing the situation as the level rises to a point near but below the outflow conduit 46, it will be evident that the lower portion of conduit 44 will contain only a liquid which has passed through the filter having a lower content of organic material than that in the tank.

As the level rises still further, to and above the level of the outlet conduit 46, outflow will take place from the latter. This outflow is then a liquid partially purified by the action occurring in the filter, separated as just indicated from the more impure material in the tank by the column of this partially purified liquid contained in the lower portion of the conduit 44. Since the effluent from the filter is continuous and flow through the conduit 44 continuously downward, there is no possibility that the liquid in the tank will back up to the level of the outlet conduit 46. A short length of the conduit 44 below the outlet conduit 46 is sufficient to provide this isolation of the material in the tank from the outlet, though if desired, the conduit 44 may be extended downwardly further than illustrated.

It will be noted that this isolating action is completely consistent with the maintenance of level in the tank at, or approximately at the conduit 46 which, in effect, therefore constitutes an overflow. The outlet conduit 46 should be of sufficient size to provide ample overflow for any reasonably expected rate of entry of the sewage through the inlet 12. The conduit 46 need not necessarily be a pipe but may be provided by an overflow trough if desired.

From the foregoing description it will be apparent that the present invention provides for the automatic control of the liquid level in tank 10 while, at the same time, providing a final effluent through outlet 46 the biochemical oxygen demand of which is much less than that of the liquid in tank 10.

FIGURE 2 diagrams a system having the same functions as that illustrated in FIGURE 1 and heretofore described but is simpler in the arrangement of elements used. The recirculation tank corresponding to tank 10 is shown at 48 and adjacent to it there is a tank 50 constituting the final purification unit, the two tanks having a common wall 52 and interconnected at an upper level by a passageway 54. The inlet to the recirculation tank is provided at 56 at a level desirably, through not necessarily, lower than that of the passage 54. Purified effluent from the tank 50 passes outwardly through the conduit 58 which is located at a level at least slightly above the level of the bottom of opening 54 so that for effluent to occur through the conduit 58 the level in the tank 50 must be at least slightly above the lower portion of the opening 54. As will shortly be apparent, flow will always occur from tank 50 to tank 48 and not in the opposite direction.

A trickling filter of the type described above is provided at 60 and in this case is so arranged that its perforated bottom 62 overlaps the wall 52 so that some of the effluent therefrom in the region 64 will drop directly into the tank 48 while other effluent in the region 66 will drop into the tank 50. The relative proportioning of the effluent flow to the two tanks may be chosen somewhat arbitrarily, but the flow at 66 should under all conditions produce a supply to the tank 50 such that flow is toward the left through the opening 54.

A recirculating pump 68 is provided receiving liquid from the lower portion of the tank 48 and delivering it through the pipe branches 72 and 76, the former being provided with a flow control valve 74 and the latter with a flow control valve 78, though in some instances these valves may be omitted, the pipes being sized to provide desired proportioning of delivery through the branches. The branch 72 leads liquid to the recirculation tank 48 and its outlet may be directed along a wall of this tank as previously described to maintain circulation in a general horizontal direction to prevent settling. The other pipe 76 delivers the liquid at 80 to the top of the trickling filter 60.

In operation, the arrangement is such that delivery through the pipe 76 to the trickling filter is at a rate exceeding the maximum inflow expected through the inlet 56. Under such conditions, withdrawal from the tank 48 will always produce a flow toward the left through the opening 54 so that there is no chance that the less pure liquid in tank 48 will flow into the final purification tank or unit 50. Isolation is thus effected as described in connection with the first modification, only liquid directly from the trickling filter flowing into the tank 50, and thence through the outlet 58 from the final purification unit. Baffling may of course be provided to isolate even the flow at 66 from the outlet 58 so that the liquid entering at 66 will be subject to the final purification.

It will be obvious that various modifications of apparatus and operation may be made without departing from the scope of the invention as hereinafter defined in the following claims.

What is claimed is:

1. A purification system comprising a recirculation tank having an inlet for the reception of liquid to be purified, a liquid purification unit, means withdrawing liquid from said recirculation tank and directing at least a part thereof to the top of said purification unit, means directing at least a part of the effluent from said purification unit back to said recirculation tank, including an upright conduit receiving liquid from said purification unit and having a delivery end extending into said recirculation tank at a location below the top thereof, said upright conduit being open to permit uninterrupted flow therethrough at all times during operation of the system, means directing part of the effluent from said purification unit away from said recirculation tank including a laterally extending branch of said upright conduit having its connection to said upright conduit at a level above said delivery end of said upright conduit and below the top of said recirculation tank so that the level in the recirculation tank may rise above the delivery end of said upright conduit to a level above the level of the connection of said branch to said upright conduit, whereupon effluent will be discharged from said upright conduit through said laterally extending branch, said liquid purification unit being a biological oxidizer tower, means for delivering the liquid to be purified into said recirculation tank along the wall thereof, and means directing part of the liquid withdrawn from said recirculation tank back into the same along the wall thereof, said last-named delivering means and said last-named directing means being arranged to cause circulating movement of the liquid in the recirculation tank to reduce the possibility of settling within said recirculation tank.

2. A purification system comprising a recirculation tank having an inlet for the reception of liquid to be purified, said purification unit, said means withdrawing liquid from said recirculation tank and delivering at least a part thereof to the top of said purification unit, a second tank adjacent said recirculation tank, a passage interconnecting said second tank and said recirculation tank at a level below the tops thereof, said purification unit being located above both of said tanks and having a bottom delivery end arranged to deliver a portion of its effluent into each of said tanks, a discharge conduit extending laterally from said second tank at a level above said interconnecting passage, below the top of said recirculation tank and said second tank and below the bottom delivery end of said purification unit, said means withdrawing liquid from said recirculation tank being operated to deliver liquid to said purification unit at a rate exceeding the maximum flow expected through the inlet to the recirculation tank, said liquid purification unit being constructed and arranged to deliver its effluent to said recirculation tank and said second tank in relative proportions such that flow through said interconnecting passage is from said second tank to said recirculation tank under all conditions of operation of the system.

References Cited by the Examiner

UNITED STATES PATENTS

| | | | |
|---|---|---|---|
| 2,694,043 | 11/1954 | Jenks | 210—151 |
| 3,028,967 | 4/1962 | Dannenbaum | 210—151 X |
| 3,123,555 | 3/1964 | Moore | 210—151 X |
| 3,143,498 | 8/1964 | Fordyce et al. | 210—151 X |

REUBEN FRIEDMAN, *Primary Examiner.*

J. DECESARE, *Assistant Examiner.*